United States Patent [19]
Papst et al.

[11] 3,786,290
[45] Jan. 15, 1974

[54] ELECTROMOTOR CONSTRUCTION

[75] Inventors: Hermann Papst, St. Georgen; Hans Lunde, Schramberg; Gunter Wrobel, Villingen, all of Germany

[73] Assignee: Papst-Motoren KG, St. Georgen/Schwarzwald, Germany

[22] Filed: Jan. 18, 1972

[21] Appl. No.: 218,734

[30] Foreign Application Priority Data
Jan. 21, 1971 Germany............... P 21 02 679.9

[52] U.S. Cl. .................................. 310/90, 310/67
[51] Int. Cl. ................................................ H02k 5/16
[58] Field of Search............... 310/67, 266, 62, 310/63, 43, 90, 40 MM; 308/166; 85/4

[56] References Cited
UNITED STATES PATENTS

| | | | |
|---|---|---|---|
| 2,990,112 | 6/1961 | Levy | 310/67 |
| 3,512,328 | 5/1970 | Eriksson | 85/4 |
| 3,513,339 | 5/1970 | Harris | 310/90 |
| 2,904,709 | 9/1959 | Lautner | 310/90 |
| 3,229,897 | 1/1966 | Papst | 310/67 |
| 2,926,838 | 3/1960 | Van Rijn | 310/67 |
| 3,644,066 | 2/1972 | Heob | 310/90 |
| 2,614,729 | 10/1952 | Jung | 85/4 |

Primary Examiner—R. Skudy
Attorney—Michael S. Striker

[57] ABSTRACT

A stator is surrounded by a rotor, and bearings journal the rotor for rotation. The bearings are accommodated in an elongated tubular element which coaxially surrounds the axis of rotation of the rotor and adjacent to a free end portion of which there is located a plate element on which the motor is to be mounted. The plate element extends in a plane which is at least substantially normal to the axis of rotation and a screw extends through the plate element and engages with internal threads provided in the free end portion of the tubular element to thereby mount the same and the motor to the plate element.

3 Claims, 6 Drawing Figures

ELECTROMOTOR CONSTRUCTION

BACKGROUND OF THE INVENTION

The present invention relates generally to an electric motor construction, and more particularly to the construction of a small-dimensioned electric motor.

Electric motors are of course already known in all sizes and in many different constructions. This includes small motors which are already known, for instance, for the purpose of driving small fans or blowers which are utilized for cooling electrical and electronic equipment, for instance communications equipment. In fact, a number of different types of such fans is also already known.

There are, however, certain disadvantages connected with the known small electromotors of the type here under discussion, and for the purpose mentioned above. These disadvantages are well known per se to those skilled in the art and need not be discussed in specific detail, except to point out that the economy of manufacture of such motors is not as good as it could and should be, that these motors are not as simple in their construction and thereby as reliable in their operation as is desirable, and that they cannot be as readily assembled and disassembled as is desirable.

SUMMARY OF THE INVENTION

Accordingly, it is a general object of the present invention to provide an improved electric motor construction.

More particularly it is an object of the present invention to provide an improved construction of a small-dimensioned electromotor which avoids the disadvantages set forth above with respect to the prior art.

Still more particularly it is an object of the present invention to provide such an electromotor construction which can be produced highly economically, which is simpler in its structural details than what is known from the prior art, and whose components can be more readily assembled and disassembled than was heretofore possible.

In pursuance of these and other objects which will become apparent hereafter, one feature of the invention and other objects which will become apparent hereafter, one feature of the invention resides in an arrangement of the character hereindescribed, which briefly stated comprises stator means, and rotor means rotatable with reference to the stator means about a predetermined axis. Bearing means journals the rotor means for rotation and a tubular element coaxially surrounds the axis of rotation and carries the bearing means. The tubular element has a free end portion adjacent to which is located a plate element extending in a plane which is at least substantially normal to the axis of rotation. Threaded means extends coaxial with the axis and connects the tubular element with the plate element.

It is advantageous if the threads provided in the free end portion of the tubular element —interior threads— and the threads on the threaded means have a diameter which is greater than that of the motor shaft, that is the shaft which forms part of the rotor means and which is the component of the rotor means which is actually journalled in the bearing means.

By resorting to the present invention there is obtained a construction which permits ready assembly of all components, even if the overall dimensions of the construction are extremely small, bordering on the miniature. In particular the invention is of advantage in the construction of miniature motors having a capacity of up to 50 watts.

Of course, a motor so constructed can be provided on its rotor with impeller blades and be surrounded with a frame-like or annular housing having spoke portions which are connected with the plate element. In this case a blower or ventilator is obtained and it is then advantageous if the threaded means is in form of a central coaxial screw which extends through the plate element and extends into the internal threads provided in the free end portion of the tubular element, with the plate element being engaged under pressure at one side by the head of the screw and at the other side by the end face of the free end portion of the tubular element.

If a ventilator construction is in fact provided, then it is advantageous if the housing is at least in part of synthetic plastic material, and if the same is true of the plate element which, however, should advantageously have embedded in its synthetic plastic material a plate portion of a material having higher mechanical strength than the synthetic plastic, for instance steel, with an opening through which the screw can pass.

To reinforce the tubular element in the region of the free end portion, where it is provided with the internal screw threads it is advantageous, according to a further concept of the invention, to surround it with an additional tubular element, with both elements advantageously being entirely smooth and of constant diameter and with the outer tubular element frictionally engaging the inner tubular element, for instance by being friction-fitted onto it, so that it surrounds the free end portion of the inner tubular but terminates short of —that is does not extend all the way to— the free end face of the end portion of the inner tubular element. The plate element is then preferably provided with a recess on the side facing the free end portion, the recess having a diameter which is only slightly larger than the outer diameter of the free end portion which latter extends into it so that the motor construction is thus automatically centered with respect to the plate element.

It is also advantageous if the diameter of the internal screw thread provided in the free end portion of the tubular element is either equal to or larger than the outer diameter of the bearing means accommodated in the tubular element, because this makes it possible to insert these bearing means —of which there are at least two provided— from opposite axial ends into the tubular element during assembly, without experiencing any difficulties in so doing.

The inner diameter of the tubular element is advantageously such that over the entire length it is of constant value, excepting of course the internal screw thread. In other words, the inner diameter of the tubular element will be of constant value over the entire length thereof before the interal screw thread is provided. In fact, it is advantageous if the outer diameter of the tubular element is similarly of constant value over the entire length, excepting in the case where an outer tubular element is friction-fitted onto the free end portion of the inner tubular element. With such a construction utilizing the possibilities outlined above the construction and assembly of the entire bearing arrangement for the motor is very simple and highly economical, but yet the construction itself is strong and important advantages over the prior art are thus obtained.

In order to reduce the axial length of the electromotor construction, that is the length in the direction of its axis of rotation, it is advantageous to provide the shaft of the screw with an axially extending recess in its free end, and having an end portion of the shaft of the rotor extend into this recess. The recess may have arranged in the region of its bottom an insert of a self-lubricating synthetic plastic material which limits axial movement of the rotor shaft in one direction. A further improvement in the operation of the motor can be obtained if intermediate the bottom of the recess and the insert of self-lubricating synthetic plastic material there is interposed an additional insert of resiliently yieldable porous material, for instance felt, which is impregnated with a suitable lubricant. In this case the rounded end of the rotor shaft may be in contact with the insert of self-lubricating synthetic plastic material.

There are certain applications when it is desired to seal the bearing arrangement, both against the entry of foreign matter and/or against the escape of lubricant. According to a concept of the invention this can be achieved by providing that side of the screw head which faces the plate element with a projecting sharp-edged annular bead surrounding the shaft of the screw and which when the screw is tightened will engage the side of the plate element which is remote from the tubular element, thus providing a seal with the plate element.

It is also advantageous if the side of the plate element which faces toward the tubular element is provided with a projection which extends into a recess or cut-out of the tubular element so as to prevent relative angular displacement of the tube when the screw is threaded into the threads of the tubular element.

It is further possible to obtain a sealing of the bearing construction not by utilizing the sharp edged circumferential bead, but instead by applying to the meshing threads of the screw and of the tubular element before they are placed into mesh, a flowable preferably anaerobically hardenable sealing material such as is for instance available under the tradename "Loctite". After applying this material the threads are brought into mesh and when the material has then set or hardened, an absolutely reliable seal is obtained which will not permit the passage of any matter, including silicon oil, and at the same time of course an excellent retention of the screw against loosening due to vibrations is obtained.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
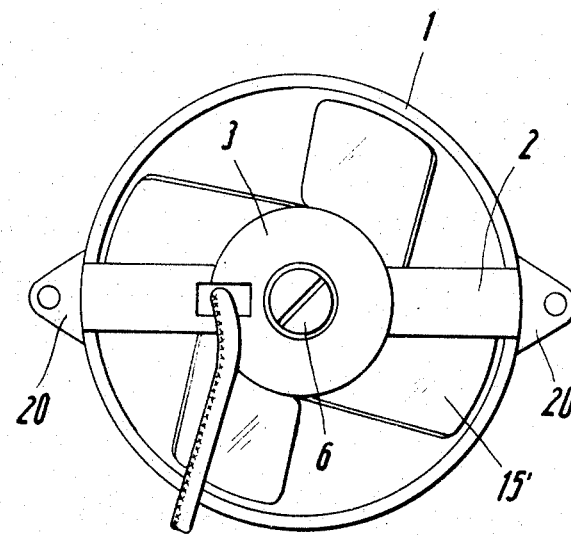
FIG. 1 is an end view of one embodiment of the invention.
Figure 2:
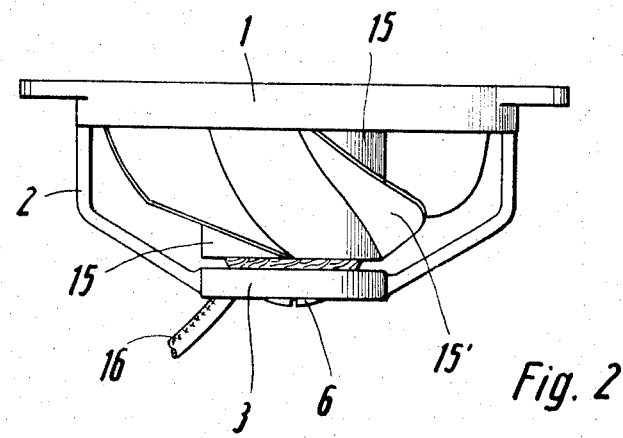
FIG. 2 is a top view of FIG. 1.

Discussing firstly FIGS. 1–4 of the drawing it will be noted that these illustrate a single embodiment. The invention is here shown as embodied in an electromotor and fan or blower, having an annular or frame-shaped housing 1 provided with a plurality of spoke portions 2 which carry at their inner ends a plate-shaped bearing element 3. The motor is an external-rotor type and identified with reference numeral 4, being carried by a tubular element 5 which is provided at one free end portion adjacent the element 3 with an internal screw thread 39. A screw or bolt 6 is provided having on its stem an external screw thread 38 (see FIG. 4), with the stem passing through the element 3 and meshing with the internal screw thread 39.

The motor 4 has a stator with the packet or stack of laminations 7; the stator is supported by the tubular element 5 which accommodates two axially spaced bearings 9 and 10. The rotor is identified with reference numeral 14 and in this embodiment surrounds the stator, being provided with a shaft 11 which is fixed to and rotates with the rotor 14 and which extends into the bearings 9 and 10 to be journalled by the same for rotation. Circlips or spring rings 12 are clamped onto the shaft 11 to prevent it from undesired axial shifting.

Figure 3:
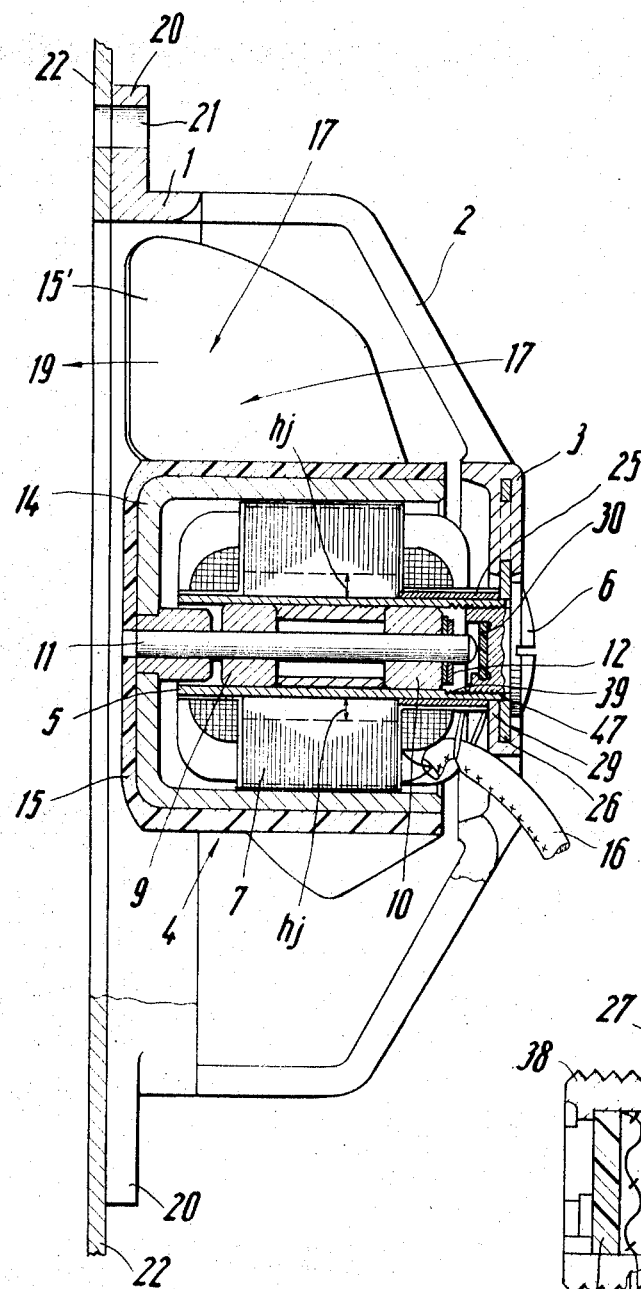
FIG. 3 is a partly sectioned view, on an enlarged scale, illustrating the embodiment of FIGS. 1 and 2.

The rotor 14 is surrounded at its exterior, as most clearly shown in FIG. 3, with a jacket 15 which is of synthetic plastic material and provided with impeller blades 15'. The jacket 15 and the impeller blades 15' are advantageously produced in a single manufacturing operation by injection molding them onto the substantially bell-shaped rotor 14.

Reference numeral 16 diagrammatically illustrates a conductor via which the motor 4 is supplied with electrical energy. When this is done the rotor 14 turns, causing the blades 15' similarly to rotate and resulting in aspiration of air in the direction of the arrows 17; this air is then ejected in substantially axial direction as indicated by the arrow 19.

At two preferably diametrally opposite locations the housing 1 is provided with lugs 20 having openings 21 by means of which the housing 1 may be secured to a component (such as a wall) 22 of an electrical device or the like, utilizing screws or similar fastening elements which have not been illustrated.

Reference to FIGS. 1–4 will indicate that in this embodiment the free end portion of the tubular element 5 which is located adjacent the plate element 3 is surrounded at the exterior by a lightly press-fitted outer tubular member 25. The purpose of this is to reinforce the tubular element 5 in the region where the internal screw thread 39 is provided, and the outer tubular member 25 is pressed against a plate portion 26 which is imbedded in the material of the element 3 —the latter material advantageously being synthetic plastic and the plate portion 26 advantageously consisting of a material (such as steel) of higher mechanical strength than the plastic—when the screw 6 is tightened in a sense drawing the plate element 3 and the tubular element 5 together.

It will be noted, however, that the tubular member 25 does not extend all the way to the free end face of the tubular element 5, or rather of the free end portion thereof, so that the free end face of the tubular element 5 can extend without abutment into a recess 47 provided in the plate 26 and having such dimension that the free end portion of the tubular element 5 can be received therein readily but without any substantial play. This results in automatic and effective centering of the motor 4 in the housing 1, and it will be appreciated that the accuracy of the outer tubular member 25 which also acts as a distancing member determines the seat of the tubular member 5 and of the motor 4 on the plate element 3. The outer tubular member 25 is advantageously of a higher-strength material than the tubular element 5, thus permitting lesser-quality and less expensive material to be used for the inner tubular element 5.

It is advantageous if, as illustrated in the embodiment of FIGS. 1–4, the tubular element 5 and the member 25 are both smooth tubular components of constant inner and outer diameter, so that they can be produced simply by utilizing cut-offs from tubular stock of requisite dimensions. In particular, short lengths of for instance seamless drawn precision steel tubing can be utilized for the tubular member 25 and require nothing more than simple working in order to give them an end face (that which is to abut against the plate element 3 or an associated component) which is exactly normal to the central longitudinal axis of the tubular member 25. A softer material may, as already indicated above, be used for the tubular element 5.

It is of course well known that in the case of a very small motor as much copper as possible should be provided in the winding groove in form of as many windings as possible, and the groove should consequently have as large as possible a radial depth, as indicated in broken lines in FIG. 3 in the stack of laminations 7. Because of this the outer diameter of the tubular element 5, particularly if an internal stator of an external rotor motor is involved, should be as small as possible in order to obtain a sufficient yoke dimension $h_j$. However, it should be noted that on the other hand sufficient space for the relatively large-dimensioned sinter-material bearings 9 and 10 must be provided in order to guarantee a maintenance-free (including lubrication-free) operation for several thousand hours, a requirement which is particularly important in certain applications, for instance if the motor drives a ventilator finding use in communications equipment. Therefore, the inner diameter of the tubular element 5 should be as large as possible to permit the use of large-dimensioned bearings 9 and 10. The two requirements can be reconciled by having the wall thickness of the tubular element 5 be relatively small in the region of the stack of laminations 7. In actual practice this means that the wall thickness of the tubular element 5 will be small throughout, which then requires that the tubular element 5 be reinforced in the region of its internal thread 39 by the provision of the outer tubular member 25. By resorting to the composite provided according to the present invention, utilizing two simple inexpensive cut-offs from readily available tubular stock, an expensive turning of one-piece construction can be omitted and the savings in terms of material are at least 30 percent of the price which would otherwise be required for the aforementioned turning.

As already suggested earlier, it is desirable that the bearings 9 and 10 be insertable from opposite axial end into the interior of the tubular element 5, and of course this must be possible without damaging either the bearings 9 and 10 on the one hand or the internal thread 39 provided in the free end portion of the tubular element 5 on the other hand. In order to make this possible when the tubular element 5 has a constant internal diameter, a particular thread must be utilized for the internal thread 39, for instance a fine thread which will not interfere with the insertion of the bearings 9, 10.

Figure 4:
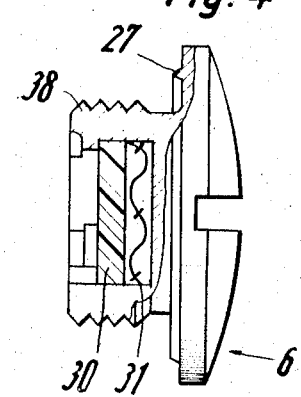
FIG. 4 is a detail view on an enlarged scale, partly sectioned, of a component of the embodiment in FIGS. 1–3.

On its side facing the plate portion 26 the head of the screw 6 is provided with a projecting sharp-edged annular bead 27, as shown in FIG. 4. This surrounds the stem of the screw 6 and when the latter is tightened with the threads 38 and 39 meshing, the sharp bead 27 presses against the plate portion 26 or a sealing element which may be interposed between it and the head of the screw 6, thus sealing the interior of the tubular element 5 and the bearings therein against the ambient surroundings with sufficient reliability. It is pointed out, however, that alternate sealing possibilities exist. Thus, the thread 38 and/or the thread 39 may be first coated with a flowable sealing substance, preferably of the type which will harden anaerobically, such as is for instance available commercially under the tradename "Loctite", whereupon the threads 38 and 39 are brought into mesh. When the sealing substance has hardened, it will seal the threads and thereby the interior of the tubular element 5 and the bearings therein.

The stator is prevented against displacement during tightening of the screw 6 by providing the inner side of the plate member 3 with a projection 29 which extends into an appropriate recess or cut-out of the outer tubular member 25.

As FIG. 4 shows most clearly, the free end of the shaft of the screw 6 is provided with an axial recess or depression into which the end portion of the shaft 11 extends. A plate shaped insert 30 is located in this depression and is preferably of a synthetic plastic material having self-lubricating characteristics, for instance a polytetrafluoethylene of the type available under the tradename "Teflon". If desired there can also be interposed between the plate shaped insert 30 and the bottom wall bounding the recess, an elastically yieldable porous plate shaped insert 31, for instance composed of felt, which is saturated with a lubricant.

Figure 5:
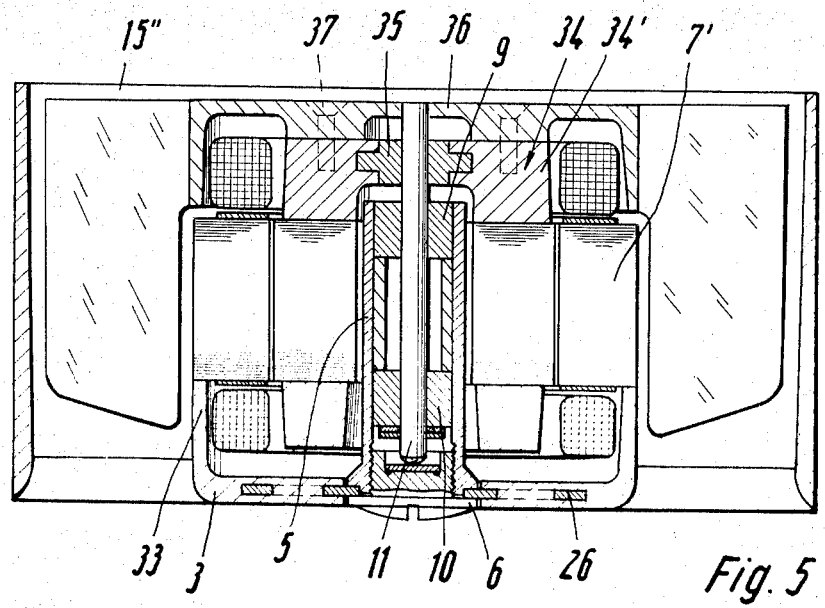
FIG. 5 is a cross-section through a further embodiment of the invention.

FIG. 5 shows that the invention can also be applied in internal-rotor motors. Here, the stator and the stack of laminations 7 are mounted on inwardly extending projections of the star-shaped component 33 of the plate member 3, by means of suitable but non-illustrated screws. This aspect of the FIG. 5 construction is not of importance for the present invention and the screws are therefore not shown.

In this embodiment, however, the rotor 34 is a cage rotor and connected with the shaft 11 via a cast-in bushing 35. The bell-shaped part of the rotor 34 carries impeller blades 15'', and the part 37 is connected via screw 37 to the ring 34' of the rotor 34. The connection of the tubular member 5, which surrounds the bearings 9 and 10, with the plate member 3 is effected in the same manner as discussed in the embodiment of FIGS. 1–3.

Figure 6:
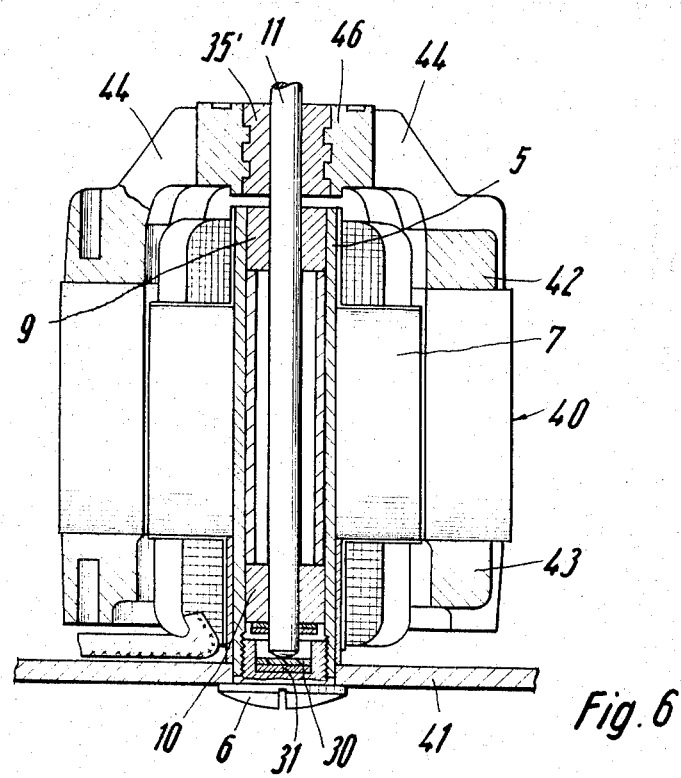
FIG. 6 is another cross-section through an additional embodiment of the invention.

Finally, FIG. 6 illustrates how an external-rotor motor 40 of the cage type can be connected to the chassis 41 of an electric device. It is known that a cage rotor tends more to axial vibrations than other types, and for this reason the screw 6 is configurated in the manner suggested in FIG. 6 in this embodiment. The rings 42 and 43 are of one piece with the radial struts 44 at the end face of the rotor housing, and with the housing component 46 surrounding the sleeve 35'. In other respects this embodiment also utilizes the features of the embodiment in FIGS. 1–3.

It will be understood that each of the elements described above, or two or more together, may also find a useful application in other types of constructions differing from the types described above. While the invention has been illustrated and described as embodied in an arrangement of the character outlined herein, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. Arrangement as described, comprising stator means; rotor means rotatable with reference to said stator means about a predetermined axis and having a shaft coincident with said axis; bearing means journalling said shaft of said rotor means for rotation; a tubular element coaxially surrounding said axis and carrying said bearing means, said tubular element having a free endportion provided with an open end; a plate element located at said free endportion in a plane which is at least substantially normal to said axis, said plate element having two sides one of which faces towards said free endportion, and being provided with an opening extending between said sides; and threaded means coaxial with said axis, connecting said tubular element with said plate element and closing said open end of said free endportion, said tubular element and threaded means having respective meshing threads of a diameter larger than that of said shaft, and said threaded means being a screw having a head located at the other of said sides and bearing thereagainst, a threaded stem extending through said opening and meshing with said thread of said tubular element said stem including an axial recess, and a plate-shaped lubricating insert within said recess.

2. An arrangement as defined in claim 1, said plate element having a side facing toward said free endportion and provided with a projection; and wherein said free endportion has a recess accommodating said projection.

3. An arrangement as defined in claim 1, wherein said stator means surrounds said tubular element, and wherein said tubular element has a minimum wall thickness in the region of the laminations of said stator means, corresponding to less than half the yoke thickness of said laminations.

* * * * *